C. F. ROBERTS.
PHONOGRAPHIC DRIVING MECHANISM.
APPLICATION FILED AUG. 23, 1917.

1,293,622.

Patented Feb. 4, 1919.
2 SHEETS—SHEET 1.

Witnesses:

Inventor
Charles F. Roberts
By Williams Bradbury & Lee
Attorneys

C. F. ROBERTS.
PHONOGRAPHIC DRIVING MECHANISM.
APPLICATION FILED AUG. 23, 1917.

1,293,622.

Patented Feb. 4, 1919.
2 SHEETS—SHEET 2.

Witnesses:
Andrew Kintneow
Robert F. Bracke

Inventor
Charles F. Roberts
By Williams Bradbury & Lee
Attorneys

UNITED STATES PATENT OFFICE.

CHARLES F. ROBERTS, OF CHICAGO, ILLINOIS, ASSIGNOR TO CHICAGO METAL PRODUCTS COMPANY, OF CHICAGO, ILLINOIS, A CORPORATION OF ILLINOIS.

PHONOGRAPHIC DRIVING MECHANISM.

1,293,622.   Specification of Letters Patent.   Patented Feb. 4, 1919.

Application filed August 23, 1917. Serial No. 187,748.

*To all whom it may concern:*

Be it known that I, CHARLES F. ROBERTS, a citizen of the United States, residing at Chicago, in the county of Cook and State of Illinois, have invented a certain new and useful Improvement in Phonographic Driving Mechanism, of which the following is a full, clear, concise, and exact description, reference being had to the accompanying drawings, forming a part of this specification.

My invention relates to phonographic driving mechanism, and has for its general object the provision of mechanism for driving the record turn table of a phonograph, which is noiseless in its operation and which requires comparatively little lubrication for operation.

In accomplishing this general object I eliminate the usual form of gearing extending between the driving element and the turn table, and utilize in its place a novel arrangement of friction transmission, which, in the preferred form of the invention is self-adjusting and requires no manual adjustment after installation.

Figure 2:
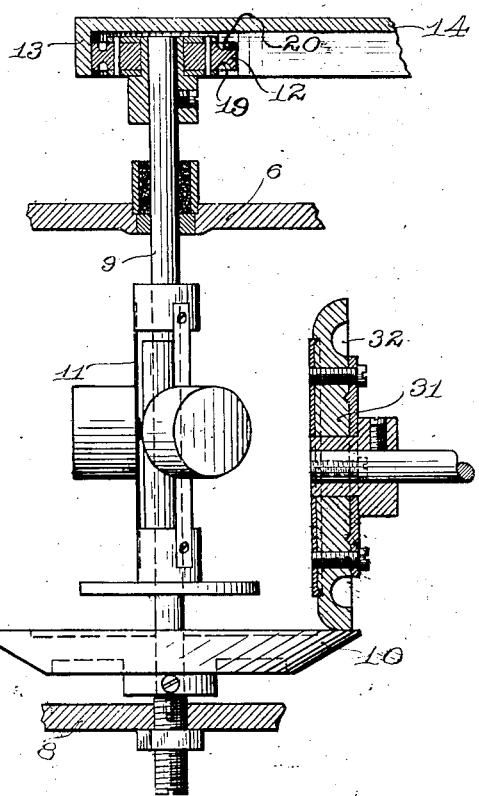
Figure 3:
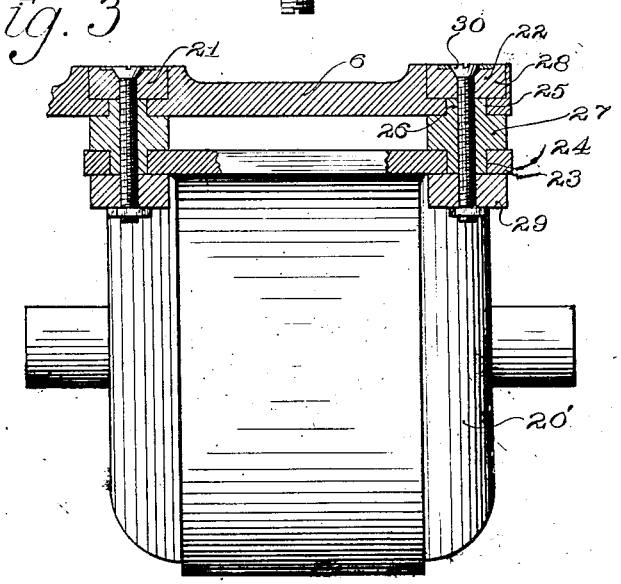

Considerable objection has been met in the past in the use of an electric motor, particularly an alternating current motor for phonographs, due to the hum of the motor while a selection is being reproduced by the phonographic mechanism, and because of this objection the electrically driven phonograph has not met with the success it might have attained, notwithstanding its otherwise numerous advantages over the spring driven motor. It is one of the objects of the present invention to provide an electrically driven phonograph which is absolutely silent in its operation, even though an alternating current motor be employed. A further object of the invention is the provision of a novel arrangement of parts, constituting the transmission mechanism extending between the driving element and the turn table, all of which will be pointed out in detail in connection with the accompanying drawings, wherein Figure 1 is a front elevational view of a phonographic base board or motor board provided with the turn table and driving mechanism of my invention, some of the parts being broken away to reveal more clearly the internal construction;

Fig. 2 is an enlarged detail view of the transmission mechanism extending between the electric motor and the turn table; and Fig. 3 is an enlarged detail view showing the resilient mounting between the electric motor and its support.

Similar characters of reference refer to similar parts throughout the several views.

Figure 1:
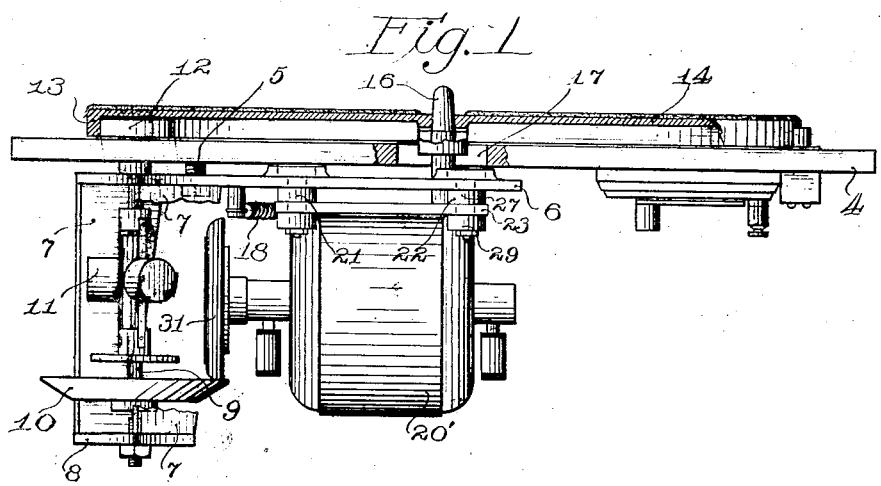

Referring first to Fig. 1, 4 designates the usual base board or motor board commonly used in connection with phonographic constructions, which is arranged to be held in place upon the phonographic cabinet. Attached to the under side of the base board 4 by means of screws, one of which is illustrated at 5, is a bracket 6 having two depending arms 7, 7 attached thereto and connected at their lower ends by the plate 8. Journaled in the bracket 6 and the plate 8, and extending upwardly through the base board 4 is a shaft 9, to which is keyed a wheel 10, preferably constructed of metal. The shaft 9 above the wheel 10 is provided with the centrifugal speed governor mechanism shown at 11. The end of the shaft 9 extending above the base board 4 has fixed thereto a resilient friction wheel 12, most clearly shown in Fig. 2. This wheel is arranged to have frictional driving connection with the inside face of the downwardly extending peripheral flange 13 provided on the turn table 14. The upper face of the turn table is arranged to receive and hold in place the usual disk record which coöperates with a sound reproducer in the usual way. The turn table 14 is mounted on a shaft 16, which extends vertically through the aperture 17 provided in the base board, and is arranged to have movement in a plane normal to its axis. A spring is employed at 18 which tends to move the shaft 16 in a direction away from the shaft 9, so that the inside face of the depending flange on the turn table is held in frictional engagement with the wheel 12 at all times. The mechanism just referred to for maintaining the frictional connection between the turn table and the friction wheel forms no part of the present invention, and is disclosed and claimed in my copending application Serial No. 117,172, filed August 28, 1916.

In order to provide the requisite amount of flexibility in the friction wheel 12 so that it may operate properly to drive the turn table, the wheel is provided with the undercuts shown at 19 and 20 in Fig. 2. This wheel is preferably constructed of soft vulcanized rubber, and because of this undercut arrangement, it is caused to drive the turn table without slippage.

Attached to the under side of the bracket 6 is an electric motor 20', preferably a motor adapted to run on alternating as well as direct current, which is connected to the bracket 6 in a manner such that the transmission of vibration is prevented from the motor to the bracket 6, and thus to the base board 4. To prevent such transmission of sound, resilient mountings are provided between the motor and the bracket 6, and in Fig. 3 I have shown two of such mountings in detail, there being four provided in the preferred arrangement. In this figure I have shown at 21 and 22 a pair of resilient mountings. The mountings are alike in construction, and it will be necessary, therefore, to describe only one of them. The motor 20' carries a base 23 provided with an aperture 24 in substantial alinement with an aperture 25 in the bracket 6. Extending into the apertures 24 and 25 of the motor 23 and bracket 6 respectively is a rubber collar 26 provided with an enlarged portion 27, which serves to space the motor from the bracket. The upper side of the bracket 6 is provided with a depression in which is disposed a rubber block 28. A similar rubber block is utilized at 29 on the under side of the motor base 23. Extending vertically through the rubber mountings 26, 28 and 29 is a screw 30 which holds the parts in place.

The armature shaft of the electric motor 20' is connected at its outer end with a flexible wheel 31, which has its periphery in driving engagement with the flat face of the wheel 10. The flexible wheel 31 is undercut as shown at 32, so that it contains the required amount of flexibility to provide an efficient driving connection between the armature shaft of the motor and the vertically extending shaft 9.

It will be seen from the above that the electric motor is rendered absolutely noiseless in that sound cannot be transmitted from the motor through its mountings or from the motor through the armature shaft and transmission mechanism, due to the flexible wheels employed, at 12 and 31.

Due to the provision of the flexible wheel 31 and the flexible mounting of the motor, the wheels 10 and 31 are maintained in driving relation at all times. In assembling the device the motor is first hung as described, so that its armature shaft lies in a substantially horizontal plane. The wheel 10 is then placed in position tightly against the flexible wheel 31 with the result that the flexible motor mountings on the left-hand side (Fig. 1) are slightly compressed and the motor shaft slightly tilted away from the horizontal. The left-hand end of the motor (Fig. 1) thereby has a tendency to move downwardly, and because of this tendency the required frictional engagement between the wheels 10 and 31 is maintained. I also wish to call attention to the fact that although the motor mounting is extremely flexible, it is such that it cannot be harmed nor can the parts of the motor be broken or moved out of place during shipment.

Having thus described my invention, what I claim as new and desire to secure by Letters Patent of the United States is:

1. A phonograph comprising a base board, a turn table on the upper side thereof, an electric motor on the under side of the base board, resilient means for mounting the motor on the base board so as to prevent the transmission of vibration from the motor to the base board, and a driving connection between the motor and the turn table.

2. A phonograph comprising a base board, a record turn table on the upper side thereof, a bracket on the under side of the base board, and attached thereto, an electric motor depending from the bracket, rubber mountings interposed between the motor and the bracket to prevent transmission of vibration from the motor to the bracket, and a resilient driving mechanism between the motor and the turn table.

3. A phonograph structure including a record turn table having a depending peripheral flange and a resilient friction driving wheel having driving connection with the said flange, said wheel being undercut to provide the requisite amount of flexibility.

4. Driving mechanism for phonographs, including a frictional driving connection comprising a driving member and a driven member, one of said members comprising a flexible wheel having one of its faces undercut to provide the requisite amount of flexibility.

5. A phonograph comprising a base board, a record turn table on the upper side thereof, said turn table being provided with a depending peripheral flange, a driving shaft extending upwardly through the base board, and a flexible friction wheel fixed to the shaft and engaging the inner face of the depending annular flange, said wheel having one of its flat faces provided with an undercut to render it of sufficient flexibility for proper operation.

6. In a phonograph the combination with a base board of a motor, headed members for securing the motor to the base board, and rubber mountings interposed between the motor and the base board and between the motor and the heads of said headed members.

7. A phonograph comprising a base board, a turn table rotatably mounted in said base board, means for driving said turn table, comprising a friction disk, a motor pivotally mounted to swing in a plane extending at an angle to the plane of the disk and provided with a resilient drive wheel contacting with said disk, and resilient means for urging said drive wheel against the surface of said disk.

8. A phonograph comprising a base board, a turn table rotatably mounted in said base board, means for driving said turn table, comprising a friction disk, and a motor pivotally mounted to swing in a plane extending at an angle to the plane of the disk and provided with a resilient drive wheel contacting with said disk.

9. A phonograph comprising a base board, a record turn table on the upper side thereof, said turn table being provided with a depending peripheral flange, a driving shaft extending upwardly through the base board, and a flexible friction wheel fixed to the shaft and engaging the inner face of the depending annular flange, said wheel having both of its flat faces provided with an undercut to render it of sufficient flexibility for proper operation.

10. A phonograph comprising a base board, an electric motor on the under side of the base board, a pair of rubber blocks for mounting the motor on the base board so as to prevent the transmission of vibration from the motor to the base board, said blocks being spaced longitudinally of the motor, a friction wheel mounted on the armature shaft of the motor, and a second friction wheel having driven engagement with the first wheel, the disposition of the second wheel being such as to provide compression of one of the said mountings, whereby the motor has a tendency to maintain the required frictional engagement of the wheels.

In witness whereof I hereunto subscribe my name this 20th day of August, A. D. 1917.

CHARLES F. ROBERTS.

Witnesses:
 ANDREW WINTERCORN,
 MARY A. COOK.